Feb. 6, 1940.   C. M. CARINGTON   2,189,056
MEANS FOR ATTACHING A UNION NUT OR THE LIKE TO THE END OF ANOTHER MEMBER
Filed May 6, 1938
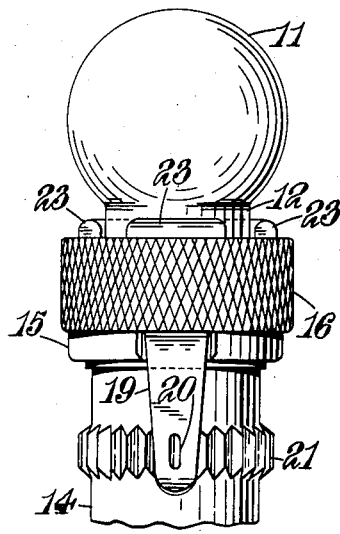
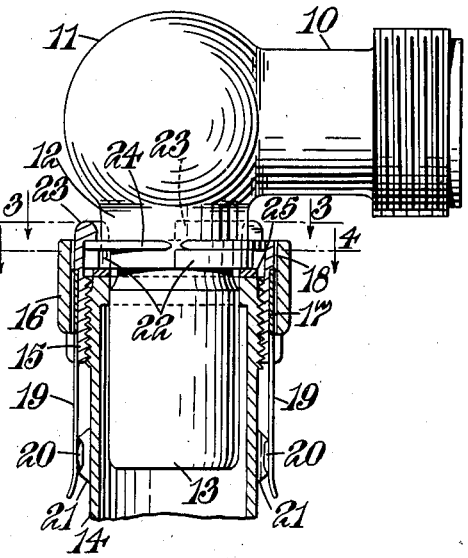
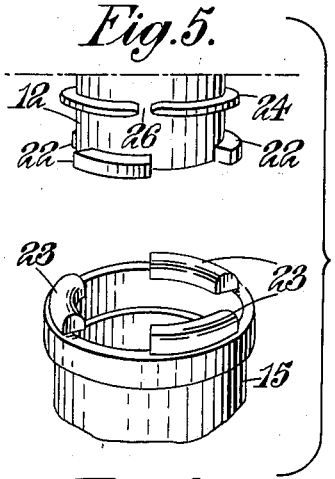
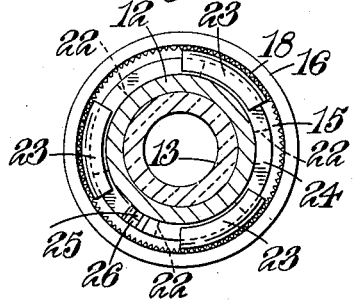
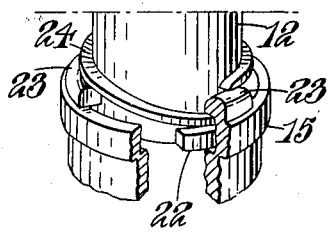
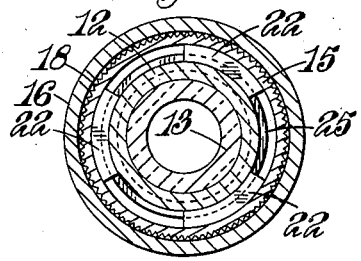
Charles Molyneux Carington
by his attys.
Stebbins, Blenko, & Parmelee Patented Feb. 6, 1940

2,189,056

UNITED STATES PATENT OFFICE 2,189,056

MEANS FOR ATTACHING A UNION NUT OR THE LIKE TO THE END OF ANOTHER MEMBER

Charles Molyneux Carington, London, England, assignor to K. L. G. Sparking Plugs Limited, London, England, a British company Application May 6, 1938, Serial No. 206,489 In Great Britain June 23, 1937

1 Claim. (Cl. 287—91)

This invention relates to an improved joint between a union nut and an inner member whereby the inner member may be joined by means of the nut to the end of a third member. Where the nut has an inwardly-directed flange which, in the assembled joint, must lie behind an outwardly-directed flange on the inner member, it has hitherto been necessary either to pass the nut on to the inner member from the remote end of the inner member or else to form one of the flanges after the nut is in position. The object of the invention is to enable a joint to be made where neither of these methods is possible or convenient.

According to the invention, a joint between a union nut and an inner member with respect to which a nut is rotatable comprises an internal flange on the nut and an external flange on the inner member, said external flange having a larger diameter than said internal flange, and a split washer substantially surrounding the inner member and lying between the adjacent faces of the two flanges so as to prevent endwise separation between the nut and the said inner member.

A specific embodiment of the invention will now be described, by way of example, as applied to the joining of two parts of the tubular casing enclosing the high-tension lead of the ignition system of an internal-combustion engine. In the accompanying drawing:

Figure 1 is an elevation, partly in section, of a coupling for housing the conductor which connects a sparking-plug to the magneto, Figure 2 is an outside elevation at right-angles to Figure 1, Figure 3 is a section on the line 3—3 of Figure 1, showing certain parts relatively angularly displaced, Figure 4 is a section on the line 4—4 of Figure 1, and Figures 5 and 6 are diagrammatic perspective views to explain the method of assembly.

As shown in Figures 1, 2, 3 and 4, the coupling comprises a horizontal limb 10, a spherical enlargement 11 at the corner, and a downwardly-extending limb 12. The elbow is lined with a moulding of synthetic resin of which a cylindrical portion 13 protrudes downwardly within a metal tube 14 which is lined with insulating material (not shown). The tube 14 forms an upward extension from the body of a sparking-plug (not shown), and the apparatus illustrated in the drawing serves the purpose of connecting the high-tension cable from the magneto electrically and mechanically to the sparking-plug and of forming a continuous metallic screen from the body of the sparking-plug to the metal braiding surrounding the cable; the screen thus formed prevents the emission of radiations which might interfere with radio reception and excludes water and other foreign matter from access to the electrical conductors within the lining 13 and the tube 14.

The elbow 10, 12, and the tube 14, are held together by a nut-member which comprises a central screw-threaded portion 15, an outer knurled sleeve 16 and an intermediate ring 17. The ring 17 is wrapped, as a strip of metal, around a groove in the central portion 15 and the sleeve is then pressed on from the top (as seen in the drawing) so as to make tight engagement with serrations 18 formed on the portion 15 above the groove aforesaid whereby the ring 17 is imprisoned between the sleeve and the portion 15. The ring 17 is formed with two downwardly-extending fingers 19 each of which is pressed with a ridge 20 at its lower end to engage teeth 21 formed on the tube 14. The nut-member is thereby locked against rotation on the tube 14 except when force is deliberately applied to the sleeve 16.

The limb 12 of the metal elbow is formed at its lower end (see also Figures 5 and 6) with an outwardly-directed flange which is cut away so as to leave three castellations 22 each of approximately sixty degrees in angular extent and each spaced by an interval of sixty degrees from the next. The top of the screw-threaded portion 15 of the nut-member is formed with an inwardly-directed flange which is cut in exactly the same way, so as to leave three symmetrically arranged inwardly-directed castellations 23 each of sixty degrees in angular extent. The angular extent of each of the six castellations 22 and 23 is, in fact, slightly less than sixty degrees so as to permit one set of castellations to pass through the gaps between the others, as described below.

It will be seen that the spherical portion 11 of the metal elbow is too large to permit the nut-member to be passed along the limb 10 into the position it occupies in Figure 1 and that the portion 11 is so near to the castellations 22 that it is impossible to form a flange at the top of the nut-member after the nut-member has been placed in that position. According to the invention, therefore, the nut-member is first slid along the limb 12, by engaging the castellations 23 with the gaps between the castellations 22, until the castellations 23 abut against the spherical portion 11. A split steel washer 24 is now inserted into the gap between the two sets of castellations.

The manner of assembly will be more clearly understood from the diagrams of Figures 5 and 6. The washer 24 is first distorted into a helix, one end of which is inserted behind one of the castellations 22 and the helix then rotated until the washer lies wholly behind the castellations as shown in Figure 5. The nut-member is now slid on to the limb 12, the castellations 22 passing through the gaps between the castellations 23, until the castellations 23 lie between the washer 24 and the castellations 22; the space between the castellations 22 and the washer 24 is exaggerated in Figure 5, for the purpose of clearness. One end of the washer 24 is now pressed down, as shown in Figure 6, into the gap between a castellation 23 and a castellation 22. The washer is then rotated until it lies wholly between the two sets of castellations, as shown in Figure 1. The nut-member may now be screwed on to the tube 14; preferably the top of the tube is separated from the castellations 22 by an aluminium washer 25.

The manner in which the washer 24 has to be deformed in order to be passed beyond the castellations 22 on to the limb 12 is not illustrated in the drawings but will be clear from the description given above of the similar operation of screwing the washer into the space between the two sets of castellations 22, 23.

The elbow 10, 12, may be rotated to any convenient position before the nut-member is tightened and the castellations 22, 23, and the gap 26 in the washer 24 will ordinarily all be out of register with one another as shown in Figure 3. Should one set of castellations lie exactly in register with the gaps between the castellations in the other set, the washer 24 resists separating forces between the two parts 12 and 15 by shear stress. Such stress will occur at six points around the washer except where the gap 26 in the washer happens to lie exactly between the end of one castellation 22 and the adjacent end of the next castellation 23; in this position the washer is stressed at only five points and it is clear that the number of such points of stress can never, in any circumstances, be less than five.

The number of castellations in each set 22, 23 is preferably such that, on the one hand, the washer 24 will be in shear at as many points as possible when the castellations in one set lie exactly opposite the gaps between the castellations in the other set and, on the other hand, there is a gap in each flange of sufficient size to permit the fitting of the washer into position in the manner described above with reference to Figures 5 and 6. Although, in the example described above with reference to the drawing, there are three castellations in each flange, a larger number of castellations might be provided where the invention is to be applied to a joint between members of larger diameter.

An advantage of the invention is that the internal diameter of the screw-threads in the portion 15 of the nut-member may be smaller than the external diameter of the castellated flange 22 on the limb 12; in this way the invention gives a more compact arrangement than is possible with union nuts of ordinary construction.

In the example illustrated, the inner member 12 is tubular but the invention might also be applied to a joint between a solid inner member and a tubular outer member. Instead of the flat steel washer 24 a wire or ring of any suitable cross-section and length may be used as a key.

I claim:

A joint, between a union nut and an inner member with respect to which the nut is rotatable, comprising an outwardly-directed castellated flange on the inner member lying behind an inwardly-directed castellated flange on the nut, the external diameter of the flange on the inner member being greater than the internal diameter of the flange on the nut and the castellations of each flange being capable of passing through gaps between the castellations of the other, and a split washer substantially surrounding the inner member and lying between the adjacent faces of the two flanges so as to prevent endwise separation between the nut and the inner member.

CHARLES MOLYNEUX CARINGTON.